(12) United States Patent
Chuang et al.

(10) Patent No.: US 7,692,403 B2
(45) Date of Patent: Apr. 6, 2010

(54) POWER CONTROL APPARATUS

(75) Inventors: Chih-Tarng Chuang, Taipei (TW); Jeng-Jye Wu, Taipei (TW); Shih-Chin Lu, Taipei (TW); Chien-Hua Chen, Taipei (TW); Li-Jen Lee, Taipei (TW)

(73) Assignee: Compal Electronics, Inc., Taipei (TW)

( * ) Notice: Subject to any disclaimer, the term of this patent is extended or adjusted under 35 U.S.C. 154(b) by 493 days.

(21) Appl. No.: 11/162,148

(22) Filed: Aug. 30, 2005

(65) Prior Publication Data

US 2006/0267553 A1  Nov. 30, 2006

(30) Foreign Application Priority Data

May 24, 2005  (TW) ............... 94116837 A

(51) Int. Cl.
*H02J 7/02* (2006.01)
*H02J 7/00* (2006.01)

(52) U.S. Cl. .................. 320/111; 320/128
(58) Field of Classification Search .......... 320/128, 320/107, 118, 111
See application file for complete search history.

(56) References Cited

U.S. PATENT DOCUMENTS 6,498,461 B1 * 12/2002 Bucur ................. 320/145
6,741,066 B1   5/2004 Densham et al. ......... 320/145
7,002,265 B2 * 2/2006 Potega ................. 307/149
2004/0075418 A1 * 4/2004 Densham et al. ......... 320/111
2006/0033474 A1 * 2/2006 Shum .................. 320/128

FOREIGN PATENT DOCUMENTS

CN  1366371  *  8/2002

* cited by examiner

*Primary Examiner*—Bao Q Vu
*Assistant Examiner*—Jue Zhang
(74) *Attorney, Agent, or Firm*—Jianq Chyun IP Office

(57) ABSTRACT

A power control apparatus and method for an electronic device is provided, which utilizes a charge current control module and a feedback signal control module to transfer the power control signal to a remote-controlled adapter through a feedback circuit, to control the output voltage of the remote-controlled adapter so as to adjust the charge current until the total input current supplied by the remote-controlled adapter is equal to the highest total input current. Therefore, the system of the electronic device can be provided with sufficient power to process needed procedures in a safe condition. Besides, according to the power required by the system of the electronic device, the controller can distribute the power for both the system and the battery in order to improve the efficiency of power use.

16 Claims, 3 Drawing Sheets

POWER CONTROL APPARATUS

CROSS-REFERENCE TO RELATED APPLICATION

This application claims the priority benefit of Taiwan application serial no. 94116837, filed on May 24, 2005. All disclosure of the Taiwan application is incorporated herein by reference.

BACKGROUND OF THE INVENTION

1. Field of the Invention

The present invention relates to a power control method, more specifically, to a method of controlling the voltage of the supplying power of the transformer utilizing the feedback signal, for efficient distribution of power use.

2. Description of the Related Art

At present, the power of portable electronic apparatus all relies on the external power supply connected to the electronic device. The method of power supply is to use the charge controller inside the portable electronic device to transfer the power information to the controller in the adapter connected to the portable electronic device, so that the adapter can provide the battery with appropriate charge voltage or charge current, and provide the portable electronic apparatus with sufficient power for operation. Wherein, the above power information includes battery voltage, battery current and the power requirement of the portable electronic device.

It is discovered after search, that O2 Micro has already disclosed a related prior art (U.S. Pat. No. 6,741,066, Title: Power management for battery powered appliances). FIG. 1 is a device block diagram according to this power control method. Wherein, the power of the electronic device 110 is provided by AC/DC adapter 120, and the power needed for charging the battery 112 is provided by charge controller 111. In addition, a power conditioning unit 113 is included to distribute power to the first sub-system 114, second sub-system 115 and the third sub-system 116. Wherein, a feedback signal 130 is also included. The generated feedback signal is fed back to the AC/DC adapter 120 by the charge controller 111 to achieve the remote power control purpose.

It can be seen from the power control method used in the power control apparatus illustrated in FIG. 1 that, when the power use status of the electronic device 110 appears to be overloading, the AC/DC adapter 120 will stop supplying power to the electronic device 110 immediately to avoid the AC/DC adapter 120 from overloading and triggering safety hazards. However, when the electronic device 110 is overloaded, if the AC/DC adapter 120 stops supplying power to the system 110 immediately, the electronic device 110 could easily crash, which is very inconvenient for users.

SUMMARY OF THE INVENTION

The object of the present invention is to provide a power control apparatus and method for an electronic device. This power control method uses a charge current control module to control the power output of a remote-controlled adapter, for adjusting the battery charge voltage, so that even if the power of the electronic device is suddenly overloaded, the remote-controlled adapter would not shut down and the system would not crash. And the present invention can also transform the charge power originally supplied to the battery into the power for the system, according to the system power requirement of the electronic device. The method of controlling the supplied power voltage of the adapter to increase efficient power use, not only ensures the safety of the electronic device, but also increases the power use efficiency, and save energy.

Accordingly, the present invention provides a power control apparatus for an electronic device, wherein the electronic device has a battery and a system. The power control apparatus includes a remote-controlled adapter, an input current detecting module, an amplifier, a maximum total input current setting module, a charge current control module, a feedback signal control module, and etc, wherein the remote-controlled adapter provides a total input current to the battery and system. The input end of the input current detecting module is connected to the output end of the remote-controlled adapter, and the output end of the input current detecting module is connected to the battery and the system respectively. The input end of the amplifier is connected to another output end of the input current detecting module, and the maximum total input current setting module is connected to the input end of the amplifier. The input end of the charge current control module is connected to the output end of the amplifier, the input end of the feedback signal control module is connected to the output end of the charge current control module, and the output end of the feedback signal control module is connected to the remote-controlled adapter. The present invention presets a maximum total input current in the highest total input current setting module. The value of the total input current is detected by the input current detecting module. And the amplifier is used to compare the values of the total input current and the highest total input current. The output voltage of the remote-controlled adapter is adjusted by the charge current control module through the feedback signal generated by the feedback signal control module, and then the charge current supplied to battery is adjusted until the total input current as compared with the highest total input current by the amplifier are equal.

According to the power control apparatus for the electronic device described in the embodiment of present invention, a charge current detecting module is further included between the battery and the input current detecting module. The input end of the charge current detecting module is connected to the system and the output end of the input current detecting module respectively, and the output end of the charge current detecting module is connected to the input end of the feedback signal control module.

According to the power control apparatus for the electronic device described in the embodiment of present invention, a charge voltage setting module is further included between the charge current detecting module and battery, and the input end of the charge voltage setting module is connected to the charge current detecting module and the battery respectively. The output end of the charge current detecting module is connected to the input end of the feedback signal control module.

According to the power control apparatus for the electronic device described in the embodiment of the present invention, the above-mentioned input current detecting module includes a total input current detecting resistor and a voltage amplifier.

According to the power control apparatus of the electronic device described in the embodiment of present invention, the above-mentioned charge current detecting module includes a charge current detecting resistor and a voltage amplifier.

The present invention also provides a power control method for an electronic device, wherein the electronic device has a battery and a system. A remote-controlled adapter supplies a total input current to the electronic device, which respectively supplies the battery with a needed charge current and supplies the system with a needed load current. The power control method is described as follows. First, the electronic device monitors the total input current and the charge current, presets a maximum value of the total input current, a maximum charge current, and a minimum charge current, and controls the remote-controlled adapter through a feedback signal, wherein the charge current is between the maximum charge current and the minimum charge current. Next, the electronic device will determine whether the total input current and the highest total input current are equal. If they are equal, no adjustment is required, and the monitor continues. If they are not equal, then there will be two situations: 1. If the total input current is larger than the maximum value of the total input current, the output voltage of the remote-controlled adapter is reduced gradually through the feedback signal, so that the charge current is reduced gradually until the total input current equals the highest total input current, and then monitor continues. If the charge current is reduced to the preset minimum charge current, the charge current is no longer reduced. At this moment, the total input current may be higher than the maximum value of the total input current; 2. When the total input current is smaller than the maximum value of the total input current, the output voltage of the remote-controlled adapter is increased gradually through the feedback signal, so that the charge current is increased gradually until the total input current equals the highest total input current, and the monitor continues. But if the charge current reaches the preset maximum value of the charge current, then the charge current is no longer increased, and at this moment, the input total input current may be lower than the maximum input current.

According to the power control method of the electronic device described in the embodiment of the present invention, the above-mentioned maximum charge current is less or equal to the maximum current that the battery can withstand.

According to the power control method of the electronic device described in the embodiment of the present invention, the above-mentioned minimum charge current is approximately 0 Amp.

These and other exemplary embodiments, features, aspects, and advantages of the present invention will be described and become more apparent from the detailed description of exemplary embodiments when read in conjunction with accompanying drawings.

DETAIL DESCRIPTION OF THE EMBODIMENTS

Figure 1:
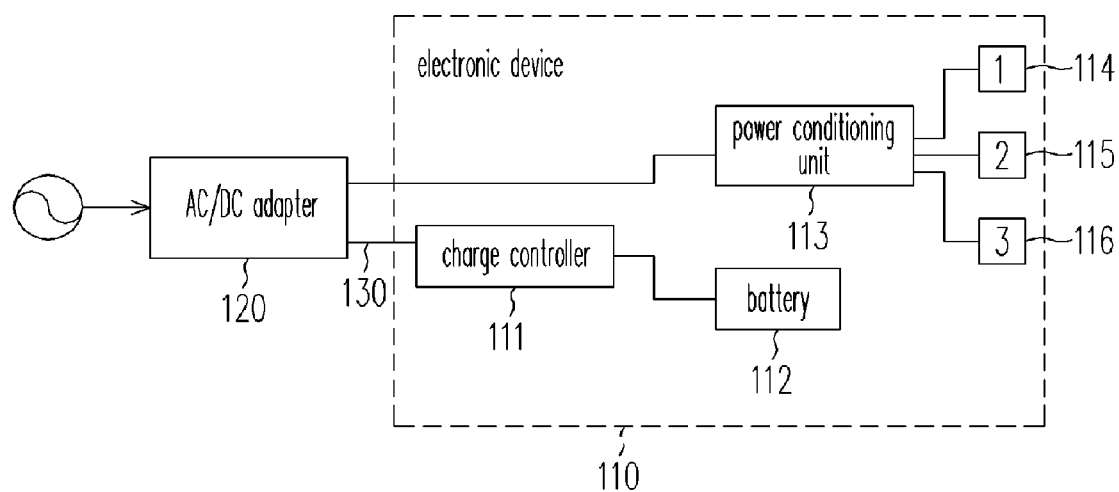
FIG. 1 is a block diagram of a conventional power management device.
Figure 2:
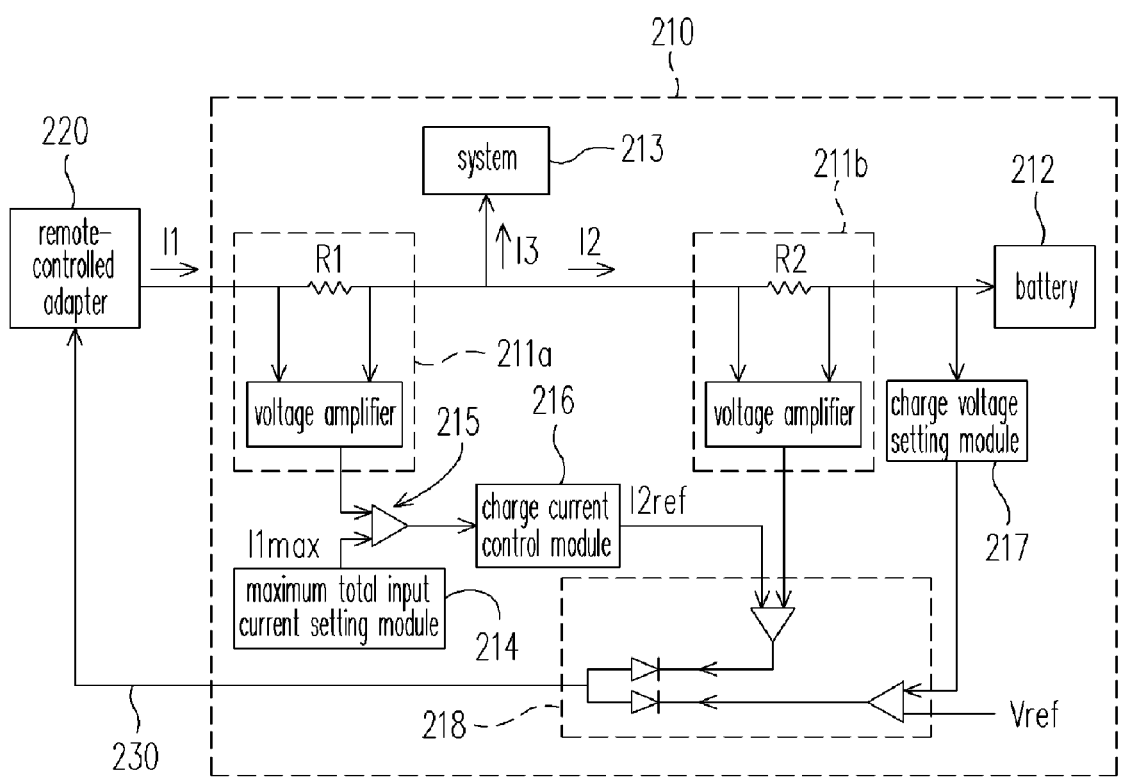
FIG. 2 is a block diagram of a power control apparatus according to an embodiment of the present invention.

FIG. 2 is a power control apparatus according to the embodiment of the present invention, wherein in addition to a battery 212 and a system 213, the electronic device 210 further includes: a total input current detecting module 211a, a charge current detecting module 211b, a maximum total input current setting module 214, an amplifier 215, a charge current control module 216, a charge voltage setting module 217, and a feedback signal control module 218, etc. The current output from a remote-controlled adapter 220 is respectively supplied to the battery 212 and the system 213. Wherein, the current output from the output end of the remote-controlled adapter 220 sequentially passes through the current detecting module 211a, the amplifier 215, and the charge current control module 216, and then is input to the feedback signal control module 218. On the other hand, the current output from another output end of the current detecting module 211a passes through the charge current detecting module 211b, and is then also input to the feedback signal control module 218. After the current output from another output end of the charge current detecting module 211b is input into the charge voltage setting module 217, the current is also input into the feedback signal control module 218. All the signals input into the feedback signal control module 218 are input into the internal circuit of the remote-controlled adapter 220 from the input end of the remote-controlled adapter 220 through the feedback signal 230 sent by the feedback signal control module 218, and thus the remote-controlled adapter 220 is controlled.

The total input current I1 supplied by the remote-controlled adapter 220 of the present invention respectively supplies the charge current I2 for the battery 212 and the load current I3 needed by system 213. Therefore, I1=I2+I3. Through detecting the relation between the total input current I1 and the maximum value I1$max$ of the total input current, it is determined whether the charge current I2 needs to be adjusted, and then to adjust the total input current I1. The maximum value I1$max$ of the total input current is preset by the maximum total input current setting module 214. The I1$max$ will not exceed the maximum constant output current that the remote-controlled adapter 220 can supply, so as to avoid damaging the remote-controlled adapter 220. When I1>I1$max$, the signal which reduces the charge current I2 is output from the charge current control module 216. And through the feedback signal 230 output from the feedback signal control module 218, the output voltage of the remote-controlled adapter 220 is reduced. The charge current I2 is therefore reduced until I1=I1$max$. Similarly, when I1<I1$max$, the signal which increases the charge current I2 is output from the charge current control module 216 to increase the output voltage of the remote-controlled adapter 220, and so the charge current I2 is increased, until I1=I1$max$.

The feedback signal control module 218 detects the value of the charge current I2 through the signal input from the charge current detecting module 211b. Through dynamically and constantly detecting the relation between I1 and I1$max$, the charge current I2 is dynamically adjusted to make I1=I1$max$, so as to improve the efficiency of power use. Since the maximum charge current that battery 212 can withstand is limited, the charge current control module 216 of the present invention further sets a maximum charge current I2$max$ to limit the charge current I2, so that the charge current I2 can only be increased up to I2=I2$max$. Certainly, the charge current control module 216 can also preset a minimum charge current I2$min$ which is approximately 0 Amp (but can not be equal to 0 Amp to avoid the short-circuit in the circuit) to limit the charge current control module 216, so that the charge current I2 can only be reduced to I2=I2$min$. In such design, even if I2 has already been reduced to I2$min$, and the load current I3 required by the system 213 is increased suddenly and results in I1>I1$max$ for an instant, the current output from the remote-controlled adapter 220 will not stop. Therefore, the system 213 will not become unstable and crash. Since the overloading in system 213 is an instantaneous condition and does not last long, such overloading is still within the range that the remote-controlled adapter 220 can withstand. As for the so-called system 213, it is a device comprising software and hardware. Take the computer as an example, it includes CPU, RAM and OS (operating system), etc.

In the present embodiment, the total input current detecting module 211a is implemented by combining the total input current detecting resistor R1 with the voltage amplifier. A slight voltage drop will occur when the total input current I1 passes through the total input current detecting resistor R1, and then the total input current I1 is input to the voltage amplifier 215. The current signal is amplified by the voltage amplifier and is then input into the amplifier 215. The amplifier 215 receives the value of the total input current I1, and then compares the total input current I1 with the total input current maximum value I1$max$ set by the maximum total input current setting module 214. When I1>I1$max$, it indicates the load current I3 required by the system 213 is increased. At this moment, the charge current control module 216 will output a reference signal I2$ref$, which reduces the charge current I2, so that the I2$ref$ is reduced to a lower I2$ref'$ from its original value. The output voltage of the remote-controlled adapter 220 is reduced through the feedback signal 230, and the charge current I2 output is then reduced, so as to make I2=I2$ref'$. Certainly, the relation between I1 and I1$max$ is monitored continuously. If I1 is still larger than I1$max$, then the charge current control module 216 will again automatically reduce the charge current maximum value from I2$ref'$ to I2$ref''$. The output voltage of the remote-controlled adapter 220 is reduced through the feedback signal 230, and therefore the output of charge current I2 is then reduced, so that I2=I2$ref''$. In this manner, the charge current I2 is constantly monitored, compared and gradually reduced, until I1=I1$max$. On the contrary, when I1<I1$max$, it indicates that the load current I3 required by the system 213 is reduced. And at this moment, charge current control module 216 will output the signal that increases the charge current I2, so that I2 is gradually increased from its original value, until I1=I1$max$. In this way, the relation between I1 and I1$max$ is constantly monitored and compared. The output voltage of the remote-controlled adapter 220 is dynamically adjusted through the charge current control module 216, and therefore the output of the charge current I2 is adjusted, so that the total input current I1 can be effectively distributed for battery 212 and system 213 use.

Similarly, in the present embodiment, the charge current detecting module 211b is also implemented by combining charge current detecting resistor R2 with the voltage amplifier. When the charge current I2 passes through the charge current detecting resistor R2, a small voltage drop will occur, and then the charge current I2 is input to the voltage amplifier. The current signal is input into the feedback signal control module 218 after being amplified by the voltage amplifier. The remote-controlled adapter 220 is controlled through the feedback signal 230, so as to monitor the value of charge current I2. The present invention can further monitor the charge voltage of the battery 212 through the charge voltage setting module 217. After comparing with the preset reference voltage Vref, the remote-controlled adapter 220 is controlled through the feedback signal 230 output from the feedback signal control module 218, so that the charge voltage will not exceed the maximum charge voltage that the battery can withstand, to ensure the safety of the battery 212.

Figure 3:
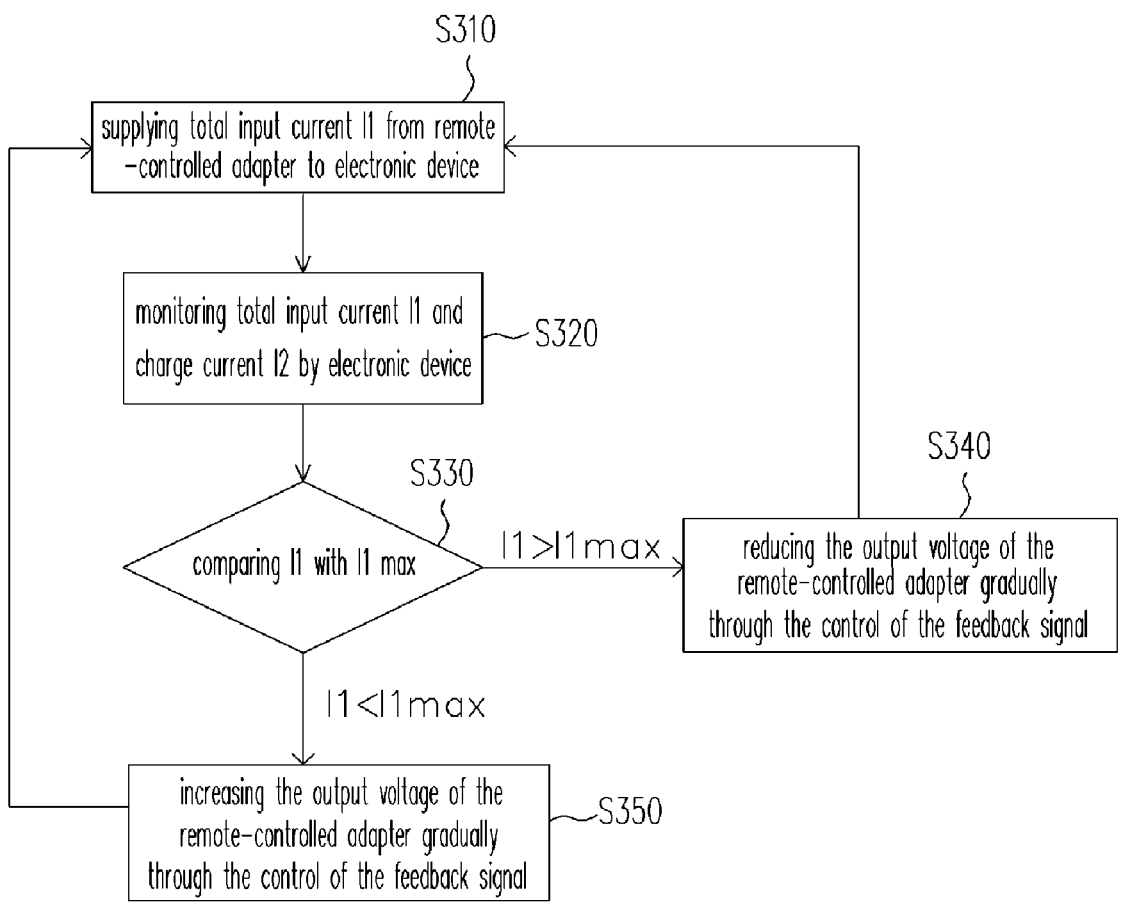
FIG. 3 is a flow chart of a power control method for an electronic device illustrated according to an embodiment of the present invention.

FIG. 3 is a flow chart of the power control method for the electronic device according to the embodiment of the present invention.

First, step S310 is performed. The remote-controlled adapter supplies the total input current I1 to the electronic device which has a battery and a system. The total input current I1 supplies the battery with charge current I2 and supplies the system with load current I3 respectively, and of course I1=I2+I3.

Step S320 is conducted. The electronic device monitors the total input current I1 and charge current I2, wherein a maximum value of the total input current I1$max$, a maximum charge current I2$max$ and a minimum charge current I2$min$ are preset in the electronic device. The remote-controlled adapter is controlled through a feedback signal. Furthermore, I2$max$ is less than or equal to the maximum current that the battery can withstand, so that the safety of the electronic device is ensured. The I2$min$ is set to be approximately 0 Amp. The electronic device will limit the charge current between the maximum charge current and the minimum charge current (I2$min \leq$I2$\leq$I2$max$), so that I2 can be minimized to I2$min$. In such design, even if I2 is reduced to I2$min$, and the load current I3 required by the system is suddenly increased such that I1>I1$max$ instantaneously, the current output from remote-controlled adapter will not stop, therefore the system will not become unstable and crash. Certainly, this is because the system overloading is an instantaneous situation and does not last long, and it is still within the designed safety range of the remote-controlled adapter.

The step S330 is conducted to compare I1 with I1$max$. At this moment, the electronic device will determine whether I1 equals I1$max$. If I1=I1$max$, then no adjustment is required, as long as the monitor of the total input current I1 and charge current I2 continues; If I1 does not equal I1$max$, then there will be two situations: 1. When I1>I1$max$, then step S340 is conducted, and the output voltage of the remote-controlled adapter is reduced gradually through the control of the feedback signal, so that the charge current is gradually reduced until the total input current I1 equals the highest total input current I1$max$, and then the total input current I1 and the charge current I2 are monitored constantly; 2. When I1<I1$max$, then step S350 is conducted, and the output voltage of the remote-controlled adapter is increased gradually through the control of the feedback signal, so that the charge current is gradually increased until the total input current I1 equals the highest total input current I1$max$, and then the monitor of total input current I1 and charge current I2 continues.

In the present power control method, the control circuit is constantly monitored and adjusted. And I1 and the preset I1$max$ are compared to see if they are equal. Through adjusting I2 such that I1=I1$max$, the power control purpose of the present invention is achieved.

To sum up, the power control apparatus and method for an electronic device of the present invention is to transfer the power control signal to the remote-controlled adapter through the feedback signal control module implemented inside the electronic device, so as to control the output voltage supplied by the remote-controlled adapter, and so as to adjust the charge current of the battery to maintain a condition that the total input current supplied by the remote-controlled adapter equals the highest total input current preset by the electronic device, so that the power can be effectively distributed to the system and battery, without shutting down the output of the remote-controlled adapter, and without causing an unstable system to crash.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A power control apparatus for an electronic device, where the electronic device has a battery and a system, the power control apparatus comprising:

a remote-controlled adapter, for supplying a total input current to the battery and the system;

an input current detecting module, an input end thereof being connected to the output end of the remote-controlled adapter, and the output end thereof being connected to the battery and the system respectively;

a first amplifier, an input end thereof being connected to another output end of the input current detecting module;

a maximum total input current setting module, connected to another input end of the first amplifier, wherein the first amplifier outputs a comparing result by comparing input signals received from the input current detecting module and the maximum total input current setting module;

a charge current control module, setting a maximum charge current and a minimum charge current to limit a charge current of the battery, the input end of the charge current control module being directly connected to the output end of the first amplifier, wherein the charge current control module outputs a reference signal to control the charge current of the battery according to the comparing result; and a feedback signal control module, the input end thereof being connected to the output end of the charge current control module, and the output end thereof being connected to the remote-controlled adapter;

wherein the maximum total input current setting module presets a highest input current, the value of the total input current is detected by the input current detecting module, the values of the total input current and the highest total input current are compared by the first amplifier, the output voltage of the remote-controlled adapter is adjusted by the reference signal of the charge current control module through a feedback signal generated by the feedback signal control module, and so the charge current supplied to the battery is adjusted and limited to be higher than the minimum charge current.

2. The power control apparatus for the electronic device of claim 1, wherein a charge current detecting module is further included between the battery and the input current detecting module, and a charge voltage setting module is further included between the charge current detecting module and the battery, wherein an input end of the charge current detecting module is respectively connected to the system and the output end of the input current detecting module, an output end of the charge current detecting module is connected to the input end of the feedback signal control module, an input end of the charge voltage setting module is respectively connected to the charge current detecting module and the battery, and an output end of the charge voltage selling module is connected to the input end of the feedback signal control module.

3. The power control apparatus for the electronic device of claim 1, wherein the input current detecting module comprises a total input current detecting resistor and a voltage amplifier.

4. The power control apparatus for the electronic device of claim 2, wherein the charge current detecting module comprises a charge current detecting resistor and a voltage amplifier.

5. The power control apparatus for the electronic device of claim 2, wherein a signal output from the charge current detecting module and a signal of the charge current control module are combined to become the feedback signal in the feedback signal control module.

6. The power control apparatus for the electronic device of claim 2, wherein a signal from the charge voltage setting module and a signal of the charge current control module are combined to become the feedback signal in the feedback signal control module.

7. A power control apparatus for an electronic device, where the electronic device has a battery and a system, the power control apparatus comprising:

a remote-controlled adapter, for supplying a total input current to the battery and the system;

an input current detecting module, an input end thereof being connected to the output end of the remote-controlled adapter, and the output end thereof being connected to the battery and the system respectively;

a first amplifier, an input end thereof being connected to another output end of the input current detecting module;

a maximum total input current setting module, connected to another input end of the first amplifier, wherein the first amplifier outputs a comparing result by comparing input signals received from the input current detecting module and the maximum total input current setting module;

a charge current control module, setting a maximum charge current and a minimum charge current to limit a charge current of the battery, the input end of the charge current control module being directly connected to the output end of the first amplifier, wherein the charge current control module outputs a reference signal to control the charge current of the battery according to the comparing result; and a feedback signal control module, the input end thereof being connected to the output end of the charge current control module, and the output end thereof being connected to the remote-controlled adapter;

wherein the maximum total input current setting module presets a highest input current, the value of the total input current is detected by the input current detecting module, the values of the total input current and the highest total input current are compared by the first amplifier, the output voltage of the remote-controlled adapter is adjusted by the reference signal of the charge current control module through a feedback signal generated by the feedback signal control module, and so the charge current, which is constantly supplied to the battery when the remote-controlled adapter is electrically connected to the electronic device, is adjusted.

8. The power control apparatus for the electronic device of claim 7, wherein a charge current detecting module is further included between the battery and the input current detecting module, and a charge voltage setting module is further included between the charge current detecting module and the battery, wherein an input end of the charge current detecting module is respectively connected to the system and the output end of the input current detecting module, an output end of the charge current detecting module is connected to the input end of the feedback signal control module, an input end of the charge voltage setting module is respectively connected to the charge current detecting module and the battery, and an output end of the charge voltage setting module is connected to the input end of the feedback signal control module.

9. The power control apparatus for the electronic device of claim 7, wherein the charge current detecting module comprises a total input current detecting resistor and a voltage amplifier.

10. The power control apparatus for the electronic device of claim 8, wherein the charge current detecting module comprises a charge current detecting resistor and a voltage amplifier.

11. The power control apparatus for the electronic device of claim 7, wherein the charge current is limited to be higher than the minimum charge current to avoid stopping supplying the total input current when the remote-controlled adapter is electrically connected to the electronic device.

12. The power control apparatus for the electronic device of claim 11, wherein the minimum charge current is not equal to 0 Amp.

13. The power control apparatus for the electronic device of claim 8, wherein a signal output from the current detecting module and a signal of the charge current control module are combined to become the feedback signal in the feedback signal control module.

14. The power control apparatus for the electronic device of claim 8, wherein a signal from the charge voltage setting module and a signal of the charge current control module are combined to become the feedback signal in the feedback signal control module.

15. The power control apparatus for the electronic device of claim 2, wherein the feedback signal control module comprises a second amplifier, a third amplifier, a first diode, and a second diode, wherein a first input end of the second amplifier is directly connected to the output end of the charge current control module, a second input end of the second amplifier is directly connected to the output end of the charge current detecting module, a first input end of the third amplifier is directly connected to the output end of the charge voltage setting module, a second input end of the third amplifier is coupled to a reference voltage, the cathode of the first diode is directly connected to the output end of the second amplifier, the cathode of the second diode is directly connected to the output end of third amplifier, and the anodes of the first diode and the second diode are connected to the remote-controlled adapter.

16. The power control apparatus for the electronic device of claim 8, wherein the feedback signal control module further comprises a second amplifier, a third amplifier, a first diode, and a second diode, wherein a first input end of the second amplifier is directly connected to the output end of the charge current control module, a second input end of the second amplifier is directly connected to the output end of the charge current detecting module, a first input end of the third amplifier is directly connected to the output end of the charge voltage setting module, a second input end of the third amplifier is coupled to a reference voltage, the cathode of the first diode is directly connected to the output end of the second amplifier, the cathode of the second diode is directly connected to the output end of third amplifier, and the anodes of the first diode and the second diode are connected to the remote-controlled adapter.

* * * * *